Figure 1:
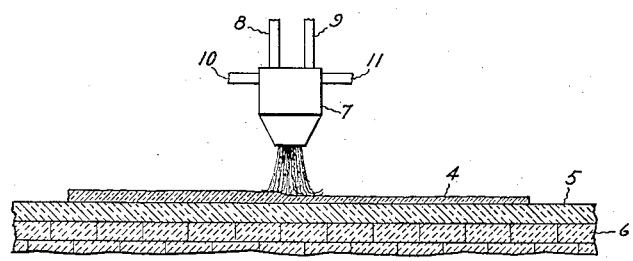

Patented Oct. 10, 1933

1,930,327

UNITED STATES PATENT OFFICE 1,930,327

COMPOSITE SILICA ARTICLE AND METHOD OF FABRICATING SAME

Elihu Thomson, Swampscott, Mass., assignor to General Electric Company, a corporation of New York Application May 10, 1932. Serial No. 610,385

4 Claims. (Cl. 49—78.1)

The present invention relates to the fabrication of massive articles, such, for example, as large telescopic mirrors, from a material such as silica which, because of its refractory nature, cannot be cast in a fused state by ordinary methods used in fabricating glass articles. It is the object of my invention to provide an improved method for fabricating such articles.

It has been customary to fabricate silica bodies of extensive surface by providing first a base of sintered silica, formed by heating a mass of sand or comminuted silica by radiant heat in an electric resistance furnace, and then depositing thereon a layer of fused, structureless silica by projecting particles of silica through a flame on this base and causing them to unite by fusion. A process for carrying out the flame-deposition of silica is described in United States Letters Patent 1,869,163, Niedergesass, patented July 26, 1932 and also in United States application Serial No. 453,362, Ellis and Winckler, filed May 17, 1930 (see corresponding French Patent 718,857), both applications being assigned to the same assignee as that of the present application.

The process of building up masses of silica by the progressive fusion and incorporation of particles of silica projected through a flame will be referred to herein briefly as an accretion process.

As described in a copending application Serial No. 610,382, filed May 10, 1932 by Alvarado L. R. Ellis and Gunnar A. F. Winckler an entire composite article, of which an astronomical mirror is an example, is formed by the accretion process, a base being sprayed at a relatively high rate and a facing layer of silica being deposited thereon at a lower rate in order to produce greater density and transparency in the facing. While this duplex spraying process can be carried out in the order named, certain difficulties are encountered. The spraying of the base causes ridges to appear on the surface of the silica mass during spraying. As the spraying continues these ridges become more pronounced instead of being smoothed out by the flame. Due to the lessened heating of the sides of the ridges, bubbles appear in the imperfectly fused silica on these sides. Furthermore, any impurities which are accidentally introduced into the mass of silica during the spraying of the base,—for example, by particles of fire-brick or the like dropping on the silica from the roof of the furnace in which the operation is carried out or by particles of metal or oxide becoming dislodged from the spraying apparatus, cause the trapping of bubbles in the sprayed product which persist throughout the sprayed base in the form of so-called "runners". As each layer is deposited the deposition of silica upon one of these "runners" causes the bubbles to continue through the material being laid down. If such "runners" are present, the facing layer of transparent silica will be imperfect to that extent. In any event the ridges must be removed before the clear layer is deposited. As this involves cooling the base to room temperature loss of time and additional expense is involved.

In accordance with my present invention these difficulties are overcome by spraying the composite body in reverse order, that is, by spraying the facing first and the relatively thick base or support subsequently.

Figure 2:
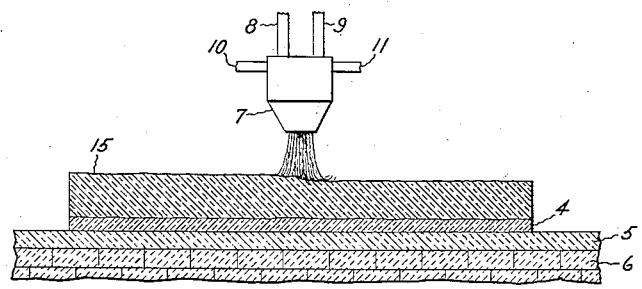
Figure 3:
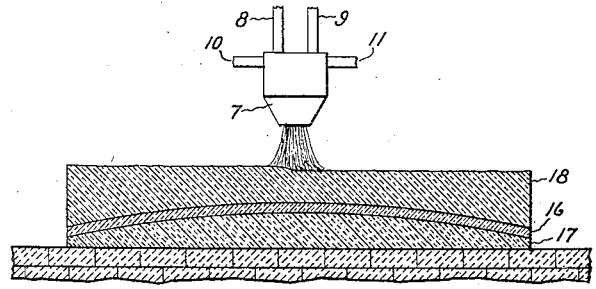
Figure 4:
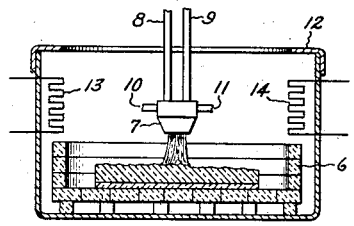

My invention will be described in greater detail in connection with the accompanying drawing in which Fig. 1 is a vertical section of the support and a clear layer of silica in the process of being deposited thereon, the burner being symbolically indicated; Fig. 2 is a vertical section illustrating the second stage of fabrication wherein a second layer of translucent silica is deposited upon the initial layer of transparent silica; Fig. 3 is a modification of my invention wherein the article is given a predetermined contour while being deposited on a support; and Fig. 4 is a somewhat diagrammatic vertical section of a heating furnace in which the silica deposition is carried out.

As illustrated in Fig. 1, a layer of silica 4 is deposited upon a support 5 consisting of suitable refractory material, as, for example a mixture of about 90 to 95 parts comminuted silica and about 10 to 5 parts ball clay, the proportions not being critical. The clay binder may be omitted under some conditions. This layer 5 rests on a support of fire brick 6. Particles of silica are caused to impinge upon the support 5 by the burner 7 and are fused together by the heat of the flame. Repeated traverse of the burner over the initial layer of silica causes a desired layer of transparent silica to be built up. The burner is supplied with combustible and combustion-supporting gases (hydrogen or the like) through the conduits 8, 9 and with finely divided silica conveyed by one of the gases from a feeding device which is not shown. Separate conduits 10, 11 are shown to convey cooling water to the burner. The deposition of the silica occurs in a suitable furnace (see Fig. 4) comprising an enclosure 12, containing a suitable heating means as conventionally indicated by the electric heaters 13, 14. As the details of construction of the burner and other parts of the apparatus and the method of supplying finely divided silica are described in the above-mentioned United States patent application and patent (and the foreign patent above identified corresponding in disclosure thereto) the particular features of this apparatus and process will not be repeated in the present application. The rate of feed of the silica powder and the gas and the rate of traverse of the flame are regulated to produce the desired density and transparency in the product.

After the clear layer 4 has been deposited, the rate of feed of the silica preferably is materially increased, thereby causing corresponding increase in the rate of deposition of the silica but resulting in the deposition of silica layer 15 which may be less transparent, may contain gas inclusions and is of a lower density than the transparent silica. As this lower density layer eventually forms the backing layer when the article produced is to be used for supporting the reflecting surface in astronomical mirrors, this inclusion of gas bubbles and resulting non-transparency of the silica is of no disadvantage. On the other hand, advantages accrue due to the increased rate of deposition of the relatively thick layer 15, and its lesser weight per unit of volume. For example, for deposition of a high grade, transparent layer 4, a rate of feed of silica may be employed with a given set of conditions, such as the size and shape of the burner, the rate of gas feed, rate of traverse of burner and so forth, whereby $\tfrac{1}{10}$ cubic inch of silica is deposited by the combustion of about ten cubic feet of hydrogen, or other suitable combustion-supporting gas, this deposition occurring at a rate requiring about one hour.

If this relatively slow rate of deposition were continued during the fabrication of the entire article, it would not only greatly increase the cost of the desired article but also devitrification of the silica might occur in the long heating period resulting in destruction of the resulting article. If, on the other hand, the rate of deposition is increased ten times or more, then devitrification will not occur, but on the other hand the silica deposited under the conditions will not be clear and free from gas bubble inclusions. For a base or backing layer this is of no disadvantage. For practical purposes a cheaper grade of silica also may be employed for the backing layer than for the face.

As shown in Fig. 3, the initial deposition of the article during the accretion process with a configuration roughly similar to the final desired configuration results in less grinding and is less tedious and expensive. Referring to this figure, a layer 16 is first formed upon a support 17, which has an external configuration corresponding to the desired configuration of the layer 16 which in the completed article will form the external layer. The layer 17 comprises a mixture of comminuted quartz or silica mixed with a suitable binder such as fire clay, as above described. This particular shape of the base layer 17 is to be considered as merely illustrative. Upon the support 17 is deposited successively the clear layer of silica 16 and a translucent backing layer 18 by the burner 7 as above described.

It is to be understood, of course, that when either the article with the flat surface, as shown in Fig. 2, or with a shaped surface, as shown in Fig. 3, is completed, it is removed from the base or supporting surface and is freed from clinging particles of the base by grinding and polishing or by other suitable procedure. When the support consists either of fire brick, as shown in Figs. 1 and 2, or of a mixture of silica and fire clay, as shown in Fig. 3, little difficulty is experienced in cracking off the supporting layer from the silica. The article finally may be trimmed, given a desired exact surface configuration and otherwise finished to a desired form. If desired, the layer of clear silica may be increased in thickness by further spraying of silica thereon.

What I claim as new and desire to secure by Letters Patent of the United States, is,—

1. The process of making an article of vitreous refractory material by the accretion of particles of said material at its fusion temperature which consists in feeding said particles into a fusion zone during the formation of one part of said article at a rate at which a transparent dense product results and subsequently feeding particles of said material into a fusion zone during the formation of another part of said article at a materially higher rate whereby a less transparent and less dense product is formed.

2. The process of making a vitreous silica article by the accretion of silica particles with one another at the fusion temperature of silica which consists in feeding said silica particles during the formation of one part of said article at a rate at which the resulting product is transparent and dense and subsequently feeding said silica particles during the formation of another part of said article at a materially higher rate at which a product is formed which is of lesser density and transparency.

3. The process of forming a silica article having a predetermined configuration which consists in forming a support having the desired external configuration, depositing a layer of vitreous transparent silica on said support by accretion, thereafter increasing the rate of deposition of silica to form a less dense layer of silica on said transparent layer, and finally removing the silica article thus made from the support.

4. The process of making an astronomical mirror of vitreous silica which consists in forming a support consisting of siliceous material and a bonding agent, traversing the surface of said support with a flame capable of fusing silica and projecting silica powder through said flame on said support at a rate at which a transparent layer of silica is formed on said support, subsequently increasing the rate of feed while continuing said traverse to deposit on said transparent layer a translucent, less dense layer of silica, removing from said support the silica thus deposited and giving the transparent layer of silica a desired finishing treatment.

ELIHU THOMSON.